United States Patent [19]

Li

[11] Patent Number: 4,537,755
[45] Date of Patent: Aug. 27, 1985

[54] SELECTIVE OLIGOMER PRODUCTION

[75] Inventor: Hsueh M. Li, Baton Rouge, La.

[73] Assignee: Ethyl Corporation, Richmond, Va.

[21] Appl. No.: 558,314

[22] Filed: Dec. 5, 1983

[51] Int. Cl.$^3$ ............................................. C01B 25/10
[52] U.S. Cl. ................................................... 423/300
[58] Field of Search ......................................... 423/300

[56] References Cited

U.S. PATENT DOCUMENTS

| | | | |
|---|---|---|---|
| 3,860,693 | 1/1975 | Graham | 423/300 |
| 4,256,715 | 3/1981 | Kinoshita et al. | 423/300 |
| 4,272,382 | 6/1981 | Ogata et al. | 423/300 |

FOREIGN PATENT DOCUMENTS

| | | | |
|---|---|---|---|
| 706806 | 3/1965 | Canada | 423/300 |
| 990580 | 4/1965 | United Kingdom | 423/300 |
| 1017375 | 1/1966 | United Kingdom | 423/300 |

*Primary Examiner*—John Doll
*Assistant Examiner*—Wayne A. Langel
*Attorney, Agent, or Firm*—Donald L. Johnson; John F. Sieberth; Joseph D. Odenweller

[57] ABSTRACT

To prepare halophosphazene oligomer enriched in cyclic trimer, a two-stage process is used. In the first stage halogen halide and ammonia are concurrently introduced into an agitated liquid reaction medium in which halophosphazene oligomer is soluble, these materials being proportioned so as to form a reaction system composed of a dilute slurry of finely divided ammonium halide particles. In the second stage phosphorus trihalide and halogen are concurrently introduced into the slurried reaction system from the first stage heated to a temperature of about 80° to about 180° C. In the process the quantities of the reactants introduced into the reaction medium are proportioned such that the ammonium halide:phosphorus trihalide molar ratio is between about 1:1 and about 3:1, and the phosphorus trihalide:halogen molar ratio is kept above about 0.5:1 and below about 2:1 until all of the phosphorus trihalide has been introduced, and thereafter the halogen is introduced in an amount sufficient to give a total phosphorus trihalide:halogen molar ratio above about 0.5:1 but below about 1:1.

3 Claims, No Drawings

SELECTIVE OLIGOMER PRODUCTION

This invention relates to a process for preparing cyclic phosphonitrilic halide oligomers in high yield. More particularly, this invention relates to a high yield process for the synthesis of cyclic phosphonitrilic chloride trimer.

BACKGROUND

Processes heretofore employed for the preparation of cyclic phosphonitrilic chloride oligomers usually produce a significant proportion of higher cyclic materials and linear materials which are undesirable for the ring-opening polymerization process. Eliminating these less desirable higher cyclic and linear phosphonitrilic chloride species requires extensive purification procedures and also reduces productivity.

The prior art teaches several general approaches toward the desired goal through control of the reaction. For example, high dilution of the reactants appears to favor increased cyclic content, the use of an excess of finely divided ammonium chloride particles favors increased cyclic content, and the slow and even addition of one reactant to the other appears to favor cyclic content. These general approaches have been described for example in U.S. Pat. Nos. 3,367,750, 3,667,922, 3,656,916, 3,658,487 and 3,780,162. Nevertheless, these prior processes produce significant amounts of petroleum ether insoluble linear phosphonitrilic chloride oligomers which must be separated from the desired cyclic species.

U.S. Pat. No. 4,196,179 to Hudson and Dominick teaches the preparation of cyclic phosphonitrilic halide oligomer mixtures by simultaneous reaction of $PCl_3$, $Cl_2$ and $NH_3$ in an inert solvent at 65°–180° C. The amount of higher cyclic (i.e., $(PNCl_2)_n$ where n is 5 or above) and linear oligomers in the product is generally in the range of 11 to 28 percent.

Various kinds of catalysts have been investigated to boost the yield of cyclic oligomers and particularly cyclic trimer. Jenkin and Lanoux (1970) investigated the effect of anhydrous metal chlorides on the yield of cyclic trimer from the reaction of $NH_4Cl$ and $PCl_5$ in a very dilute solution. Their results show that a few metal chlorides (e.g., $MnCl_2$, $MoCl_5$) increase trimer yield (total trimer yield 35–50%), but other metal chlorides (e.g., $CoCl_2$, $CuCl_2$, $HgCl_2$, $LaCl_3$, $NiCl_2$, $PbCl_2$, etc.) reduce the trimer yield (11–30%). They also show that the reaction rate is increased by the addition of the metal halide but this rate increase does not necessarily mean a trimer yield increase.

U.S. Pat. No. 4,248,845 (to Otsuka Chemical Company) teaches the preparation of tri- and tetra-phosphonitrilic chlorides in a shortened period of time in high yield by reacting $NH_4Cl$ with $PCl_5$ in an inert solvent in the presence of a selected metal oxide as a catalyst. However, the results given in this patent show that this process produces 14 to 29% of higher cyclic oligomers and linear material (1 to 23% of linear materials) depending on the nature of the metal oxide. This patent also indicates that without the use of the catalyst the yield of higher cyclic and linear oligomers will be in the range of about 58 to 60%.

More recently, U.S. Pat. No. 4,382,914 (to Nippon Fine Chemical Company) teaches the preparation of cyclic $(PNCl_2)_n$ oligomers in high yield by reacting $PCl_5$ with an excess of $NH_4Cl$ in an inert solvent in the presence of a metal chloride or an organic acid salt as a catalyst. Their results show that without a catalyst, 28.5% of linear phosphonitrilic chloride materials are obtained under the same reaction conditions. Although the process of the patent produces cyclic oligomer mixtures in high yield by using a catalyst, it apparently does not produce cyclic trimer in high yield. Yields of trimer ranging from 56 to 75% are shown.

DESCRIPTION OF THE INVENTION

In accordance with this invention high yields of the desired cyclic phosphonitrilic halide oligomers (also known as cyclic halophosphazene oligomers), especially cyclic trimer can be produced without use of a catalyst. This is accomplished by use of a novel two-stage process.

More specifically, in the first stage hydrogen halide (preferably HBr and most preferably HCl) and ammonia ($NH_3$, in gaseous or liquid form) are introduced into a reactor containing a suitable inert solvent in which halophosphazene oligomer is soluble (e.g., chlorobenzene, tetrachloroethane, etc.) and reacted at ambient temperature under constant agitation to form a suspension of finely divided ammonium halide particles. The molar quantity of hydrogen halide added should preferably equal or exceed the molar quantity of ammonia introduced during the course of the reaction.

In the second stage, phosphorus trihalide (preferably $PBr_3$ and most preferably $PCl_3$) and elemental halogen (preferably $Br_2$, and most preferably $Cl_2$) are concurrently fed into the above reaction mixture while keeping the temperature in the range of about 80° to about 180° C. (preferably about 100° to about 150° C.).

In conducting this process, the quantities of the reactants introduced into the reaction medium are proportioned such that:

(a) the ammonium halide:phosphorus trihalide molar ratio is between about 1:1 and about 3:1, (preferably between about 1.2:1 and about 2:1) ; and (b) the phosphorus trihalide:halogen molar ratio is kept above about 0.5:1 and below about 2:1 (preferably between about 0.7:1 and about 1.5:1) until all of the phosphorus trihalide has been introduced, and thereafter the halogen is introduced in an amount sufficient to give a total phosphorus trihalide:halogen molar ratio above about 0.5:1 but below about 1:1 (preferably above about 0.8:1 and below about 1:1).

Preferably, the dilute slurry formed in the first stage of the process contains less than about 1.5 mole of ammonium halide per liter of the diluent.

After the reactants have been introduced into the second stage reaction system, the system is usually subjected to a relatively short period of reflux, e.g., for a period of about 0.5 to about 3 hours.

By utilizing the foregoing process, no catalyst is needed and essentially linear-free cyclic oligomer containing about 80% of the cyclic trimer can be produced.

A wide variety of materials may be employed as liquid reaction media in the process of this invention. The chief requirements are that it be inert under the reaction conditions used and that it serve as a solvent for the halophosphazene oligomer formed. Exemplary materials for this use include aromatic hydrocarbons, such as toluene, xylene, ethylbenzene, and the like; halogenated hydrocarbons such as 1,4-dichlorobutane, 1-chlorohexane, chlorocyclohexane, chlorobenzene, dichlorobenzene, 1,2-dibromoethane, methylene chloride, 1,1,2,2-tetrachloroethane, and the like; and various other substances having the requisite characteristics.

To purify and further concentrate the cyclic trimer, the unreacted ammonium halide is separated for example by filtration, centrifugation, etc., and the filtrate is treated with an appropriate amount of molecular sieves or like porous absorbant substance to remove higher cyclic oligomers and trace amount of impurities (including linear oligomer). For best results, the filtrate or centrifugate is preferably condensed to a small volume prior to treatment with the absorbant. Alternatively, the absorbant material is added to the reaction product to effect the desired separation and purification and then both the absorbant material and the unreacted ammonium halide are separated from the liquid reaction solution by filtration, centrifugation, or the like. In either case, molecular sieves having a pore size in the range of about 3 to about 8 Angstroms is a preferred absorbant material for this use. U.S. Pat. No. 4,272,382 provides detailed information on use of various absorbant materials for effecting separations of this kind. Any solids that form in the system are then separated and the final clear liquid solution is evaporated to obtain crystalline product essentially consisting of trimer and tetramer.

The practice and advantages of this invention will become still further apparent from the following illustrative examples. In these examples the reactions were conducted in a two-liter, five-neck, creased round bottom flask equipped with a mechanical stirrer, an addition funnel (for introduction of $PCl_3$), a thermometer with a Therm-O-Watch temperature controller, inlet tubes (for controlled addition of $NH_3$ and HCl) and a condenser.

EXAMPLE 1

In the first stage, 1300 mL of monochlorobenzene was charged into the reaction flask and a very small amount of HCl was added in order to saturate the monochlorobenzene with HCl. Then while subjecting the system to constant agitation, HCl (19 g, 0.52 mole) and $NH_3$ (7 g, 0.41 mole) were introduced concurrently and continuosly into the reactor over a period of almost one hour and at ambient temperature to form a dilute slurry of finely divided $NH_4Cl$. An additional 200 mL of monochlorobenzene was then added and the temperature of the slurry was gradually raised to 125° C.

In the second stage, 47.1 g (0.34 mole) of $PCl_3$ and 25 g (0.36 mole) of $Cl_2$ were concurrently introduced over a period of about 40 minutes into the above reaction mixture at 125°–130° C. During the ensuing 20 minutes another 3.5 g of $Cl_2$ was added without any further addition of $PCl_3$ to the system. The rates of feed of HCl and $NH_3$ in the first stage and $PCl_3$ and $Cl_2$ in the second stage are shown in Table I.

TABLE I

| Cumulative Amounts of Reactants Fed to the System | | | | | | | |
|---|---|---|---|---|---|---|---|
| Elapsed Time, (hr) | Solvent Volume, (mL) | HCl (g) | $NH_3$ (g) | $PCl_3$ (g) | $Cl_2$ (g) | Molar Ratio HCl/$NH_3$ | Molar Ratio $PCl_3/Cl_2$ |
| 0 | 1300 | 0.5 | 0 | 0 | 0 | | |
| 0.17 | 1300 | 5.5 | 1.5 | 0 | 0 | 1.70 | |
| 0.33 | 1300 | 9.0 | 3.5 | 0 | 0 | 1.20 | |
| 0.67 | 1300 | 17.0 | 6.0 | 0 | 0 | 1.32 | |
| 0.83 | 1300 | 19.0 | 7.0 | 0 | 0 | 1.26 | |
| 0.83–3.0* | 1500 | | | | | | |
| 3.0 | 1500 | | | 15.7 | 6.5 | | 1.25 |
| 3.33 | 1500 | | | 31.4 | 14.5 | | 1.12 |
| 3.67 | 1500 | | | 47.1 | 25.0 | | 0.98 |
| 4.0 | 1500 | | | 47.1 | 28.5 | | 0.86 |

*During this period the temperature was raised from 40 to 125° C.

After the addition of the $PCl_3$ and $Cl_2$ in the second step was completed, the reaction mixture was refluxed for 1.25 hours at 130° C. The reaction mixture was then cooled and filtered to remove unreacted $NH_4Cl$. A 2 mL sample of the filtrate was taken and analyzed by $^{31}P$ NMR. This analysis showed that the filtrate contained 80.6 equivalent percent of cyclic trimer, $(PNCl_2)_3$, 15.2 equivalent percent of cyclic tetramer, $(PNCl_2)_4$, and 4.2 equivalent percent of cyclic hexamer, $(PNCl_2)_6$.

The solvent was stripped off with a Rotovapor stripping system to yield about 38.4 g (96% yield of cyclic oligomer mixture based on $PCl_3$ (or $PCl_5$).

EXAMPLE 2

Following the procedure of Example 1, about 70 g (1.3 mole) of $NH_4Cl$ was prepared from 22.2 g (1.3 mole) of $NH_3$ and 55 g (1.5 mole) of HCl in 1300 mL of monochlorobenzene at ambient temperature.

To this reaction mixture, 137 g (1.0 mole) of $PCl_3$ and 78.5 g (1.1 mole) of $Cl_2$ were added concurrently in about 4 hours while maintaining the temperature at 120°–130° C. An additional 200 mL of monochlorobenzene was added step-wise during the addition of the reactants to rinse the solid mass deposited on the condenser. After completion of the addition of $PCl_3$ and $Cl_2$, the reaction mixture was refluxed for an additional one hour period. Unreacted $NH_4Cl$ (13 g) was removed by filtration.

The $^{31}P$ NMR analysis of the filtrate showed the following composition of cyclic oligomers:

| | (Equivalent %) |
|---|---|
| $(PNCl_2)_3$ | 81.8 |
| $(PNCl_2)_4$ | 12.5 |
| $(PNCl_2)_5$ | 0.5 |
| $(PNCl_2)_6$ | 4.1 |
| $(PNCl_2)_{\geq 7}$ | 1.1 |

EXAMPLE 3

This example illustrates a preferred method for isolating and purifying cyclic trimer from a mixture of cyclic phosphonitrilic chloride oligomer.

A 150 mL sample of the filtrate from Example 2 was brought into contact with 3 g of molecular sieves (3 or 4 Angstrom pore size) at ambient temperature for about 2 hours. The molecular sieves were then removed by filtration and discarded.

The $^{31}P$ NMR data of the filtrate before and after treatment with the molecular sieves are shown below:

| | Before Treatment (Equivalent %) | After Treatment (Equivalent %) |
|---|---|---|
| $(PNCl_2)_3$ | 81.8 | 95.5 |
| $(PNCl_2)_4$ | 12.5 | 3.2 |
| $(PNCl_2)_5$ | 0.5 | 0.2 |
| $(PNCl_2)_6$ | 4.1 | 1.0 |

|  | Before Treatment (Equivalent %) | After Treatment (Equivalent %) |
|---|---|---|
| $(PNCl_2)_{\geq 7}$ | 1.1 | 0.1 |

EXAMPLE 4

According to the publication of Jenkin and Lanoux (J. Inorg. Nucl. Chem. 32, 2453 (1970)), $MoCl_5$ is the most effective catalyst among ten selected metal chlorides to boost the cyclic trimer yield.

This example investigated the effect of $MoCl_5$ on the yield of cyclic trimer under reaction conditions similar to those used in Example 2.

A slurry of 1.3 mole of ammonium chloride in 1.3 liters of monochlorobenzene was prepared. Then 2.7 g (0.01 mole) of $MoCl_5$ powder (dark brown) was added to the slurry of $NH_4Cl$ in monochlorobenzene. To this reaction medium, 134 g (0.98 mole) of $PCl_3$ and 82 g (1.16 mole) of $Cl_2$ were added concurrently in about 3 hours, the last 5 g of $Cl_2$ being added after the feed of $PCl_3$ had been completed. In the first stage of the process the temperature of the system ranged from ambient (room) temperature to about 64° C. The second stage reaction was conducted at 130° C. An additional 200 ml of monochlorobenzene was added during the addition of $PCl_3$ and $Cl_2$ to rinse the condenser. Rates of feed of HCl and $NH_3$ in the first step and $PCl_3$ and $Cl_2$ in the second step are shown in Table II.

TABLE II

| Cumulative Amounts of Reactants Fed to the System | | | | | | | |
|---|---|---|---|---|---|---|---|
| Elapsed Time, (hr) | Solvent Volume, (mL) | HCl (g) | $NH_3$ (g) | $PCl_3$ (g) | $Cl_2$ (g) | Molar Ratio HCl/ $NH_3$ | Molar Ratio $PCl_3$/ $Cl_2$ |
| 0 | 1000 | 0 | 0 | 0 | 0 | | |
| 0.33 | 1000 | 11.0 | 3.0 | 0 | 0 | 1.70 | |
| 1.0 | 1000 | 36.0 | 8.0 | 0 | 0 | 2.10 | |
| 1.5 | 1000 | 53.0 | 12.0 | 0 | 0 | 2.06 | |
| 2.0 | 1000 | 71.0 | 16.5 | 0 | 0 | 2.00 | |
| 2.5 | 1000 | 93.0 | 21.0 | 0 | 0 | 2.06 | |
| 2.83 | 1000 | 104.0 | 23.0 | 0 | 0 | 2.10 | |
| 3.0–4.67* | 1300 | | | | | | |
| 5.0 | 1300 | | | 25.2 | 8.0 | | 1.63 |
| 5.5 | 1300 | | | 37.0 | 20.0 | | 0.96 |
| 6.0 | 1300 | | | 56.7 | 33.0 | | 0.89 |
| 6.5 | 1300 | | | 73.2 | 50.0 | | 0.71 |
| 7.0 | 1300 | | | 122.8 | 68.0 | | 0.93 |
| 7.25 | 1500 | | | 134.0 | 77.0 | | 0.90 |
| 7.5 | 1500 | | | 134.0 | 82.0 | | 0.85 |

*During this period the temperature was raised from 64 to 130° C., and at 4.67 hours molybdenum chloride (2.7 g) was added to the system.

The reaction medium was refluxed for about one hour after the addition of $PCl_3$ and $Cl_2$ had been completed. The brownish reaction mixture was filtered to remove unreacted $NH_4Cl$ and $MoCl_5$.

The $^{31}P$ NMR analysis of the yellowish filtrate showed the following composition:

|  | (Equivalent %) |
|---|---|
| $(PNCl_2)_3$ | 79.9 |
| $(PNCl_2)_4$ | 11.1 |
| $(PNCl_2)_5$ | 0.8 |
| $(PNCl_2)_6$ | 6.6 |
| $(PNCl_2)_{\geq 7}$ | 1.6 |

By comparing the results of Examples 2 and 4, it can be seen that the yield of cyclic trimer was not improved by using a catalyst in the process.

What is claimed is:

1. A non-catalytic process for the preparation of halophosphazene oligomer enriched in cyclic trimer which consists essentially of:
    (a) concurrently introducing halogen halide and ammonia into an agitated liquid dilvent in which halophosphazene oligomer is soluble, these materials being proportioned so as to form a reaction system composed of a dilute slurry of finely divided ammonium halide particles; and then
    (b) concurrently introducing phosphorus trihalide and halogen into the slurried reaction system from (a) heated to a temperature of about 80° to about 180° C.;
the quantities of the reactants introduced into the reaction medium being proportioned such that:
    (c) the ammonium halide:phosphorus trihalide molar ratio is between about 1:1 and about 3:1;
    (d) the phosphorus trihalide:halogen molar ratio is kept above about 0.5:1 and below about 2:1 until all of the phosphorus trihalide has been introduced, and thereafter the halogen is introduced in an amount sufficient to give a total phosphorus trihalide : halogen molar ratio above about 0.5:1 but below about 1:1.

2. The process of claim 1 wherein the hydrogen halide is hydrogen chloride, the phosphorus trihalide is phosphorus trichloride and the halogen is chlorine.

3. The process of claim 2 wherein said dilute slurry of (a) contains less than about 1.5 moles of ammonium chloride per liter of said diluent.

* * * * *